US 9,253,140 B2

(12) United States Patent
Kapadia et al.

(10) Patent No.: US 9,253,140 B2
(45) Date of Patent: Feb. 2, 2016

(54) SYSTEM AND METHOD FOR OPTIMIZING WITHIN SUBNET COMMUNICATION IN A NETWORK ENVIRONMENT

(71) Applicants: Shyam Kapadia, Santa Clara, CA (US); Chengelpet V. Ramesh, San Jose, CA (US); Ming Zhang, San Jose, CA (US)

(72) Inventors: Shyam Kapadia, Santa Clara, CA (US); Chengelpet V. Ramesh, San Jose, CA (US); Ming Zhang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 273 days.

(21) Appl. No.: 13/682,534

(22) Filed: Nov. 20, 2012

(65) Prior Publication Data

US 2014/0140244 A1    May 22, 2014

(51) Int. Cl.
*H04L 12/24*    (2006.01)
*H04L 29/12*    (2006.01)
*H04L 12/935*    (2013.01)

(52) U.S. Cl.
CPC .......... *H04L 61/103* (2013.01); *H04L 49/3009* (2013.01); *H04L 61/2046* (2013.01)

(58) Field of Classification Search
CPC ....... H04L 61/00; H04L 61/103; H04L 45/66; H04L 45/74; H04L 61/6022; H04L 61/2596; H04L 45/021; H04L 45/745; H04L 49/3009; H04L 49/00; H04L 61/10; H04L 49/30; H04L 61/20; H04L 61/2046
USPC .......................... 370/255, 389, 392, 225, 259
See application file for complete search history.

(56) References Cited

U.S. PATENT DOCUMENTS

| | | | |
|---|---|---|---|
| 6,256,314 B1 | 7/2001 | Rodrig et al. | |
| 6,807,175 B1 | 10/2004 | Jennings et al. | |
| 6,934,260 B1 | 8/2005 | Kanuri | |
| 7,079,537 B1 | 7/2006 | Kanuri et al. | |
| 8,204,061 B1 | 6/2012 | Sane et al. | |
| 8,694,664 B2 | 4/2014 | Jain et al. | |
| 8,948,181 B2 | 2/2015 | Kapadia et al. | |
| 9,008,095 B2 | 4/2015 | Kapadia et al. | |
| 2003/0012202 A1 | 1/2003 | Fukutomi | |
| 2007/0028070 A1 | 2/2007 | Avergun et al. | |

(Continued)

OTHER PUBLICATIONS

U.S. Appl. No. 13/633,734, filed Oct. 2, 2012 entitled "System and Method for Hardware-Based Learning of Internet Protocol Addresses in a Network Environment," Inventors: Shyam Kapadia, et al.

(Continued)

*Primary Examiner* — Kwang B Yao
*Assistant Examiner* — Syed M Bokhari
(74) *Attorney, Agent, or Firm* — Patent Capital Group (57) ABSTRACT

A method for optimizing within subnet communication in a network environment is provided and includes receiving, at a Top-Of-Rack (ToR) switch, an advertisement from an attached host belonging to a subnet of a network environment, seeking a Media Access Control (MAC) address of a remote host in the subnet, looking up a host information database in a control plane of the ToR switch, and responding to the advertisement with the MAC address of the remote host. If the MAC address is not found, the ToR switch may not respond to the advertisement. The method can further include receiving, at the ToR switch from a remote ToR switch in the subnet, a host information of the remote host in the subnet, including an IP address and the MAC address of the remote host, the Layer 2 broadcast domain it belongs to, and storing the host information in the host information database.

17 Claims, 5 Drawing Sheets

(56) References Cited

U.S. PATENT DOCUMENTS

| | | | |
|---|---|---|---|
| 2007/0081530 A1 | 4/2007 | Nomura et al. | |
| 2007/0195793 A1 | 8/2007 | Grosser et al. | |
| 2010/0316053 A1 | 12/2010 | Miyoshi et al. | |
| 2012/0014386 A1* | 1/2012 | Xiong et al. | 370/392 |
| 2012/0027017 A1 | 2/2012 | Rai et al. | |
| 2012/0236761 A1* | 9/2012 | Yang et al. | 370/259 |
| 2013/0039218 A1* | 2/2013 | Narasimhan et al. | 370/255 |
| 2013/0094357 A1 | 4/2013 | Sankar et al. | |
| 2013/0194964 A1 | 8/2013 | Basso et al. | |
| 2013/0308641 A1* | 11/2013 | Ackley | 370/392 |
| 2014/0044126 A1 | 2/2014 | Sabhanatarajan et al. | |
| 2014/0226666 A1* | 8/2014 | Narasimhan et al. | 370/392 |

OTHER PUBLICATIONS

U.S. Appl. No. 13/658,610, filed Oct. 23, 2012 entitled "System and Method for Optimizing Next-Hop Table Space in a Dual-Homed Network Environment," Inventors: Shyam Kapadia, et al.

Himanshu Shah et al., "ARP Broadcast Reduction for Large Data Centers," Oct. 25, 2010, 12 pages; http://tools.ietf.org/html/draft-shah-armd-arp-reduction-01.

Aled Edwards et al., "Diverter: A New Approach to Networking Within Virtualized Infrastructures," WREN'09, Proceedings of the 1st ACM workshop on Research on enterprise networking, Barcelona, Spain, Aug. 21, 2009, 8 pages.

Changhoon Kim, et al., "Floodless in SEATTLE: A Scalable Ethernet Architecture for Large Enterprises," SIGCOMM '08 Proceedings of the ACM SIGCOMM 2008 conference on Data communication, Seattle, WA, Aug. 17-22, 2008, 14 pages.

Fulcrum Microsystems, "FocalPoint in Large-Scale Clos Switches: A new silicon generation enables a new datacenter switching paradigm," White Paper, Oct. 2007, 10 pages; www.fulcrummicro.com/product_library/applications/clos.pdf.

R.N. Mysore, et al., "PortLand: A Scalable Fault-Tolerant Layer 2 Data Center Network Fabric," Proceedings of Proceedings of the ACM SIGCOMM 2009 conference on Data communication, SIGCOMM'09, Barcelona, Spain, Aug. 17-21, 2009, 12 pages.

N. J. Lippis, III, "A simpler Data Center Fabric Emerges for the Age of Massively Scalable Data Centers," Jun. 2010, 12 pages; http://www.cisco.com/en/US/prod/collateral/switches/ps9441/ps9402/Data_Center_Net_Fabric.pdf.

"Brocade VCS Fabric Technical Architecture," Brocade Communications Systems, Data Center Technical Brief, Aug. 2012; 64 pages.

Cisco Systems, Inc., "Cisco Nexus 5000 Series NX-OS Operations Guide, Release 5.1(3)N1(1) Glossary," Jun. 11, 2012; 5 pages.

Cisco Systems, Inc., "Chapter 13: Configuring the MAC Address," Cisco Nexus 5000 Series Switch CLI Software Configuration Guide, Apr. 2012.

Cisco Systems, Inc., "Cisco FabricPath Design Guide: Using FabricPath with an Aggregation and Access Topology," Dec. 2011; 54 pages.

Cisco Systems, Inc., "Layer 2 Multi-Path (L2MP) Overview," Presentation, Jul. 2011; 48 pages.

Cisco White Paper, "Cisco FabricPath for Cisco Nexus 7000 Series Switches," Cisco Systems, Inc., Sep. 7, 2011, 44 pages.

Hinden, R., et al. "IP Version 6 Addressing Architecture," Internet Engineering Task Force, Request for Comments 4291, Feb. 2006.

Zhang, Mingui, "To Address the Space Limitation of Inner VLAN," Internet Draft draft-zhang-trill-vlan-extension-00.txt, May 31, 2011.

USPTO Jul. 16, 2014 Non-Final Office Action from U.S. Appl. No. 13/633,734.

USPTO Sep. 25, 2014 Notice of Allowance from U.S. Appl. No. 13/658,610.

USPTO May 9, 2014 Non-Final Office Action from U.S. Appl. No. 13/658,610.

USPTO Dec. 10, 2014 Notice of Allowance from U.S. Appl. No. 13/633,734.

* cited by examiner

| HOST INFORMATION TABLE | | | |
|---|---|---|---|
| VRF TABLE | IP ADDRESS | MAC ADDRESS | L2-SEG-ID |
| 1 | 192.168.10.1 | 0123.4567.89ab | A1 |
| 1 | 192.168.10.2 | 0123.4567.89ac | A1 |
| 2 | 192.172.10.1 | 1234.5678.9abc | B1 |

| VID MAPPING TABLE | |
|---|---|
| L2-SEG-ID | VID |
| A1 | 100 |
| B1 | 200 |

| LAYER 2 TABLE | | |
|---|---|---|
| VID | MAC ADDRESS | PORT |
| 100 | 0123.4567.89ab | FE-1/0/0 |
| 100 | 0123.4567.89ac | FE-2/0/0 |
| 200 | 1234.5678.9ABC | FE-3/0/0 |

SYSTEM AND METHOD FOR OPTIMIZING WITHIN SUBNET COMMUNICATION IN A NETWORK ENVIRONMENT

TECHNICAL FIELD

This disclosure relates in general to the field of communications and, more particularly, to a system and a method for optimizing within subnet communication in a network environment.

BACKGROUND

Data centers are increasingly used by enterprises for collaboration, for interaction amongst network elements, and for storing data and resources. A typical data center network contains myriad network elements, including servers, load-balancers, routers, switches, etc. The network connecting the network elements provides secure user access to data center services and an infrastructure for deployment, interconnection, and aggregation of shared resource as required, including applications, servers, appliances and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for optimizing within subnet communication in a network environment is provided and includes receiving, for example at a Top-Of-Rack (ToR) switch, an advertisement from an attached host belonging to a subnet of a network environment, seeking a Media Access Control (MAC) address of a remote host in the subnet, looking up a host information database in a control plane of the ToR switch, and responding to the advertisement with the MAC address of the remote host. If the MAC address is not found, the ToR switch may elect not respond to the advertisement. In a specific embodiment, the advertisement may include an Address Resolution Protocol (ARP)/Neighbor Discovery (ND) request.

In specific embodiments, the method can further include receiving, for example at the ToR switch from a remote ToR switch in the subnet, a host information of the remote host in the subnet, including an IP address and the MAC address of the remote host, and storing the host information in the host information database. The method may also include discovering, at the ToR switch, another host information of the attached host, including another IP address and another MAC address of the attached host, storing the another host information in the host information database, and distributing the another host information to the remote ToR switch. In a specific embodiment, the another host information can be discovered through Dynamic Host Configuration Protocol (DHCP) snooping, ARP/ND snooping, or Layer 2 learning.

In other specific embodiments, the method may additionally include populating a Layer 2 table in a data plane of the ToR switch with an entry having the MAC address of the remote host, receiving a data from the attached host destined to the remote host, and forwarding the data according to the Layer 2 table. The entry may be populated in the Layer 2 table before the data is received at the ToR switch. The entry may be removed from the Layer 2 table if the attached host does not converse (e.g., communicate) with the remote host for a predetermined time duration.

Example Embodiments

Figure 1:
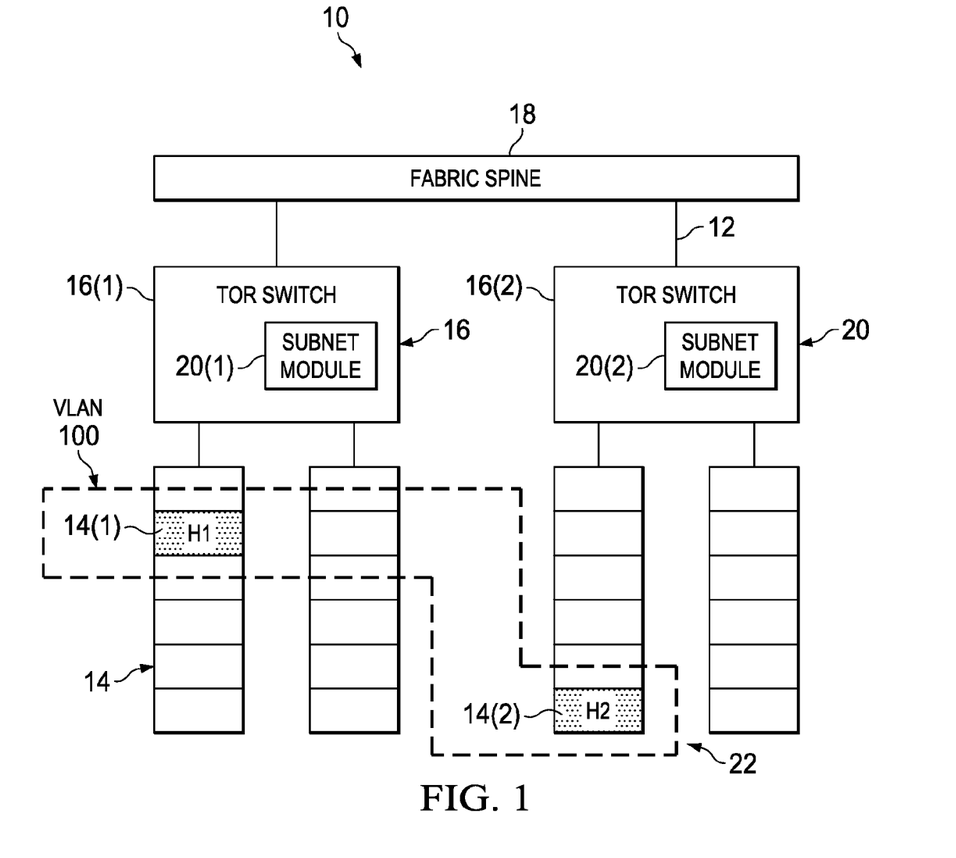
FIG. 1 is a simplified block diagram illustrating a system for optimizing within subnet communication in a network environment in accordance with one example embodiment.

Turning to FIG. 1, FIG. 1 is a simplified block diagram illustrating a communication system 10 for optimizing within subnet communication in a network environment in accordance with one example embodiment. Communication system 10 includes a network 12 connecting hosts 14 (e.g., hosts 14(1), 14(2)) over Top-Of-Rack (ToR) switches 16 (e.g., ToR switches 16(1), 16(2)) over a fabric spine 18. ToR switches 16 may include subnet modules 20 (e.g., subnet modules 20(1), 20(2)) to enable optimizing within subnet communication in network 12. Assume, merely for illustrative purposes, and not as a limitation, that hosts 14(1) and 14(2) are directly attached respectively to ToR switches 16(1) and 16(2), and ToR switches 16(1) and 16(2) may include respective subnet modules 20(1) and 20(2).

Certain terminologies are used with regard to the various embodiments of communication system 10. As used herein, the term "host" may include any network element, physical or virtual, connected to other network elements over a network. Hosts may provide data and other services to the network elements. In a client-server model, hosts may include servers. In a peer-to-peer network, each computer may be a host. Hosts may also include computers participating in networks that use Internet Protocol (IP). In a general sense, each host has a specific, unique address (e.g., IP address) associated therewith within the network. Hosts can include physical computers (e.g., servers), and virtual machines (VMs).

As used herein, the term "network element" can encompass computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

As used herein, the term "ToR switch" is inclusive of routers, switches and such other network elements with packet routing, bridging, and switching functionalities that are directly attached to one or more hosts. ToR switches may include access switches in an access/aggregation tier network topology. ToR switches may include leaf switches in a leaf/spine network topology. The term "fabric spine" is inclusive of routers, switches and such other network elements with packet routing, bridging, and switching functionalities that connect one or more ToR switches. Fabric spine 18 may include one or more spine switches.

The term "directly attached" when used in association with a pair of network elements (e.g., host directly attached to a ToR switch) can indicate that the two network elements may be connected by a communication link without any intervening switches (e.g., ToR switches, spine switches, routers, etc.). Hub-like devices such as LAN extenders may be used between the ToR switch and the directly attached host within the scope of the definition. The term "remote" when used in association with a network element (e.g., remote host, or remote ToR switch, etc.) indicates that the network element can be reached only through at least one other switch (e.g., ToR switch, spine switch, etc.) or router from the network element of reference. In other words, the remote network element is not directly attached to the network element of reference.

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Massively scalable data centers (MSDCs) generally have millions of servers with any-to-any communication capability, scalability, mobility, and agility (e.g., resource provisioning according to flexible demand) (among other features). MSDCs implement virtualization to optimally utilize server resources. Typical data center architectures have servers attached to the ToR switches (e.g., ToR switches 16) that are in turn interconnected via a fabric spine (e.g., fabric spine 18). For example, the data center network architecture may include a 2-tier leaf/spine network topology (extensible to multiple tiers) where there may be a separation between the end-station address space and topology space to allow the two to be independently scaled. Such and similar network topologies can enable any-to-any communication in MSDCs. In such MSDCs, IP has become the de-facto standard for communication.

Two of the biggest hindrances to scalability in MSDCs are floods and broadcasts (or multicasts) for communication within subnets. As used herein, the term "subnet" is a logical grouping of connected network elements. Typically, network elements in the same subnet may share contiguous ranges of IP address numbers. A mask (known as the subnet mask or network mask) can define the boundaries of the subnet. In general, a subnet is a Layer 3 construct, compared to a virtual local area network (VLAN), which is a Layer 2 construct. In a network environment employing VLANs, a one-to-one relationship can exist between VLANs and subnets, although it is possible to have multiple VLANs on one subnet (e.g., using private VLANs). VLANs and subnets can provide independent Layer 2 and Layer 3 constructs that map to one another. Any reference in this Specification to "subnet" can also include VLANs at Layer 2, and the two terms (subnet and VLAN) may be interchangeably used to refer to the logical grouping of connected network elements.

Floods typically occur for unicast traffic in a broadcast domain when there is a miss in the Layer 2 table for communication between a pair of hosts within a subnet. To switch frames between local area network (LAN) ports efficiently, the ToR switch maintains an address table called the Layer 2 table (or MAC address table). When the ToR switch receives a frame, it associates the media access control (MAC) address of the sending network element with the LAN port on which the frame was received. The ToR switch dynamically builds the Layer 2 table by using the MAC source address of the frames received. When the ToR switch receives a frame for a MAC destination address not listed in its Layer 2 table, it floods the frame to all LAN ports of the same VLAN except the port that received the frame. When the destination host replies, the ToR switch adds its relevant MAC source address and port ID to the Layer 2 table. The ToR switch then forwards subsequent frames to a single LAN port without flooding all LAN ports.

Broadcasts and multicasts occur due to Address Resolution Protocol (ARP) advertisements, IPv6 Neighbor Discovery Protocol (NDP) advertisements, Internet Control Message Protocol (ICMP) Router Discovery advertisements, etc., that are periodically sent out by the hosts in the subnet. NDP advertisements (which can include Neighbor Solicitation (NS) and Neighbor Advertisement (NA) messages) are the IPv6 equivalents for IPv4 ARP protocols for host discovery and other configuration parameters. In particular, hosts may use NDP advertisements to resolve the link-layer address (e.g., MAC address) of a neighboring host.

For example, when any host wishes to send data to another target host in the same subnet over Ethernet, it should first determine the MAC address of the target given its IP address. The IP-to-MAC address mappings are derived from an ARP cache maintained on each host. If the given IP address does not appear in the host's cache, the host cannot direct messages to the target until it obtains a new mapping. To obtain the mapping, the initiating host sends an ARP request broadcast message on the local subnet. The host with the given IP address sends an ARP reply in response to the broadcast, allowing the initiating host to update its cache and proceed to deliver messages directly to the target. Such floods and broadcasts result in packets being sent to substantially all hosts in the subnet. As the size of the subnet increases (as in MSDCs, for example), such massive scale communication can create a snowball effect, which can adversely affect scalability.

In contrast, when hosts communicate across subnets, routing (e.g., forwarding at Layer 3, rather than Layer 2) is employed and flooding may not occur after the default gateway IP to MAC binding is resolved via ARP. Some network architectures may employ routing rather than bridging (e.g., forwarding at Layer 2) for communication within subnets. With routing enabled for communication within subnets, the ARP packets from the hosts are terminated at the ToR switch itself and the ARP packets proxy with the router MAC address for remote hosts within the same subnet. In the local proxy ARP, an incoming ARP request from a local host H1 for a remote host H2 within the same subnet/VLAN, triggers a response from the ToR switch with the switch's own router MAC address (rather than the MAC address of remote host H2).

When a host A wants to talk to a remote host B attached to another ToR switch, whether in subnet or across subnet, host A may send packets to the directly attached ToR, which may lookup its Forwarding Information Base (FIB) table for next hop Layer 3 address of the destination, and route the packets accordingly. To optimally utilize the hardware resources like host routing tables (HRTs), conversational Layer 3 learning may be implemented in such architectures such that IP addresses of hosts involved in active conversation may be installed in the FIB tables of the corresponding ToR switches to the exclusion of other hosts' IP addresses.

However, routing within subnets can have certain problems. For example, communication within the subnet at Layer 2 typically would not involve any Time-To-Live (TTL) change, whereas with routing, a TTL decrement of two may occur, one on the ingress switch and another on the egress switch. Thus, the semantics of bridging, typically the mode of communication for within subnet cases, is broken. Further, with dual-stacked hosts, both IPv4 and IPv6 may have to be supported concurrently.

With IPv6, hosts typically have a link-local address (link-local address is an IP address that is intended only for communications within a subnet; routers typically do not forward packets with link-local addresses; link-local addresses are mandatory for IPv6) and one or more global-addresses (IPv6 Internet addresses). An IPv6 address takes twice (or sometimes four times) as many entries in the hardware FIB host table as an IPv4 address. Consequently, routing for within subnet cases can result in unnecessary over-utilization of the host table space especially if both link-local and global addresses are used together.

Moreover, although MAC addresses are expected to be unique within a subnet, link-local addresses typically derived from host MAC addresses are not unique across subnets. Consequently, if there are duplicative link-local addresses in different subnets within a virtual routing and forwarding (VRF) table (which is generally indexed according to the IP address, and may include multiple subnets), routing to hosts across different subnets with the same link-local addresses may not be feasible. In a virtualized environment, presence of duplicate MACs in different subnets and consequently duplicative link-local addresses may not be uncommon. However, employing bridging semantics (at Layer 2) for link-local addresses can result in floods or multicasts to hosts within the subnet of interest.

Additionally, splitting traffic within a subnet to be routed for global IPv6 addresses and bridged for link-local addresses can result in inconsistent behavior, non-availability of standardized or commercial off-the-shelf coding applications and hardware with respect to transforming link-local addresses to global addresses and vice-versa. Hence, a bridging solution may be desired for substantially all traffic within the subnet that can avoid the pitfalls associated with floods, multicasts, and broadcasts that may be present with regular Layer 2 bridging.

Communication system 10 is configured to address these issues (and others) in offering a system and method for optimizing within subnet communication in a network environment. Embodiments of communication system 10 can receive, at ToR switch 16(1), an advertisement from directly attached host 14(1) (e.g., having IP address 1.1.1.1), belonging to subnet 22 (e.g., with subnet prefix 1.1.1.0/24) in network 12. The advertisement may seek the MAC address of remote host 14(2) (e.g., having IP address 1.1.1.2) in subnet 22. ToR switch 16(1) may look up a host information database in a control plane of ToR switch 16(1) to determine the MAC address associated with IP address 1.1.1.2, and respond to the advertisement with the MAC address of remote host 14(2). If the MAC address is not found in the host information database, ToR switch 16(1) may not respond to the advertisement.

Turning to the operation of communication system 10, according to various embodiments, hosts 14(1) and 14(2) may be discovered by directly attached respective ToR switches 16(1) and 16(2) by any appropriate mechanism such as Dynamic Host Configuration Protocol (DHCP) snooping, ARP/ND snooping, Layer 2 learning, etc. Host information may be distributed among ToR switches 16(1) and 16(2) in subnet 22 using a suitable protocol such as internal Border Gateway Protocol (iBGP) or Locator/Identifier Separation Protocol (LISP) etc. In an example embodiment, the host information may be stored in software, for example, in the host information database, in control planes of respective ToR switches 16(1) and 16(2).

The host information can include VLAN ID, MAC address, IP address, VRF identifier (e.g., indicating the table corresponding to a specific routing instance), and subnet information associated with the corresponding host. (VRF is an IP technology that allows multiple instances of a routing table to coexist on the same router at the same time. Because the routing instances are independent, the same or overlapping IP addresses can be used without conflict.) If network 12 includes several (e.g., more than 4000) subnets, each subnet may be mapped to a globally unique segment identifier (L2-seg-id), and the host information can include the L2-seg-id instead of the VLAN ID. The stored host information may be searchable based on a combination of [L2-seg-id and MAC address], or another combination of [VRF and IP address], or any other suitable combination as desired based on particular needs.

In various embodiments, advertisements from hosts 14(1) and 14(2) may be terminated on directly attached ToR switches 16(1) and 16(2), respectively. As used herein, the term "advertisements" can include ARP packets, ND packets, NA packets, NS packets, GARP packets, and any other packets that include advertisements, or requests for information related to IP addresses, MAC addresses, and other network parameters. The advertisements may include NS/NA packets for link-local addresses and global addresses. For example, assume that host 14(1) wants to converse with host 14(2) in subnet 22. Host 14(1) may send out an advertisement (e.g., ARP/NS request packet) seeking the MAC address (e.g., MAC_H2) of host 14(2). Directly attached ToR switch 16(1) may trap the ARP/NS packet from host 14(1).

ToR switch 16(1) may look up stored host information in its host information database using a [VRF, IP address] combination to determine if the destination IP address (e.g., IP_H2), is known. If the host information for host 14(2) is in the host information database, ToR switch 16(1) may proxy with the destination MAC address (DMAC) of host 14(2) (e.g., MAC_H2). Before replying to requesting host 14(1), ToR switch 16(1) may map the L2-seg-id to local VLAN identification (e.g., VID), and install a mapping between VID and MAC_H2 {VID, MAC_H2} into its Layer 2 table in hardware. Subsequently, data traffic from host 14(1) to host 14(2) may be forwarded with a destination MAC address (DMAC) hit in the Layer 2 table. If the host information for host 14(2) is not known, ToR switch 16(1) may not respond to the ARP/NS request packet from host 14(1).

An entry in the Layer 2 table may not be aged out as long as either the source MAC address (SMAC) is a hit (e.g., locally attached hosts) or the DMAC is a hit (e.g., remote hosts in active conversation). Suitable software can age the Layer 2 entries (excluding directly attached host entries) as appropriate. For example, a Layer 2 manager may interact with an advertise module (e.g., that manages advertisements) to keep track of directly attached hosts. Appropriate hit bits in the layer 2 MAC table may help in the aging process. Solicited ARP/ND messages may be triggered to validate the presence of directly attached hosts that may not have spoken for a while.

Typically, on a per VLAN basis, suitable hardware can provide an ability to drop unicast packets that suffer a lookup miss in the Layer 2 table. However, given that a combination of IP and non-IP traffic can co-exist in subnet 22, IP packets whose destination addresses are not present in the Layer 2 table may be dropped while non-IP traffic may continue to be flooded on a DMAC miss. Hardware enhancements may be implemented to achieve this behavior in some embodiments. In other embodiments, Access Control Lists (ACLs) may be used to achieve the same.

For example, a Layer 2 table miss (L2_MISS) can drive a code or condition that can be used for matching in an ACL along with a further match with Ethernet traffic of a specific type (e.g., ethtype of 0x806 (for IPv4) and 0x86dd (for IPv6)) to cause the packets to be dropped. Non-IP traffic that suffers the L2_MISS may not match the ACL and may continue to be flooded. According to various embodiments, packets between hosts 14(1) and 14(2) within same subnet 22 may be unicast forwarded via bridging on Layer 2, whereas other traffic (e.g., outside subnet 22) may be routed on Layer 3.

According to various embodiments, IP packets that suffer a miss in the Layer 2 table in ToR switches 16(1) and 16(2) can be leaked to software. In some embodiments, the leak can be implemented by modifying the ACL as appropriate. For example, switching Application Specific Integrated Circuits (ASICs) can copy packets to a central processing unit (CPU), while the original packets are switched in hardware. The ACL may include an instruction to drop the packet in hardware (e.g., copy-to-cpu+drop). In another example, the ASICs may redirect the packet to the CPU. The packets may be subjected to an appropriate Control Plane Policing (CoPP) policy or rate-limiting to prevent the CPU from being overwhelmed.

In other embodiments, the leak can be implemented by utilizing a Layer 2 First-In-First-Out (FIFO) queue, depending on hardware capability, for signaling new learns to the CPU. Hardware (e.g., memory elements) may throttle packets sent to the same DMAC within a certain time-interval. CPU (e.g., through suitable software) can use the DMAC along with incoming VLAN mapped L2-seg-id as a key to lookup in the host information database. If a match indicates a known host, then the MAC address can be installed into the Layer 2 table. If the host is unknown, the Layer 2 table entry can be installed with a drop destination-index to prevent further packets to the destination from overwhelming the CPU. Subsequently, if the host becomes "known", the entry can be updated to the appropriate destination switch/port.

As MAC addresses are expected to be unique only within subnets (e.g., subnet 22), link-local IPv6 addresses, derived from the MAC addresses, can be duplicative across subnets. Consequently, the link-local addresses stored in the database may be tagged with a list of L2-seg-ids, in which they appear. When host 14(1) wants to communicate with another host 14(2) in subnet 22 using link-local addresses, the NS packet initiated from host 14(1) may be trapped in ToR switch 16(1). Link-local communication may be applicable only within a subnet.

If hosts 14(1) and 14(2) happen to have the same IPv6 link-local address, probably as a result of IPv6 Duplicate Address Detection (DaD) check failure, the error may be logged into a log server (e.g., syslog server). If the link-local address of host 14(2) in the host information database indicates that it belongs to a different subnet as compared to host 14(1), the host information may indicate an invalid case, as routing across subnets with the same link-local addresses may not be allowed. If host 14(2)'s IPv6 link-local address is a hit in the host information database, the corresponding MAC address may be obtained and ToR switch 16(1) may respond to host 14(1) with a Neighbor Advertisement (NA) (e.g., ToR switch 16(1) may proxy for host 14(2)). The MAC address for host 14(2) may be preemptively installed in the Layer 2 table in anticipation of data traffic between host 14(1) and host 14(2).

Embodiments of communication system 10 provide an approach to communication between hosts 14 (e.g., hosts 14(1) and host 14(2)) within the same subnet (e.g., subnet 22) in network environments (e.g., network 12) that adheres to bridging semantics. Embodiments of communication system 10 can have various advantages. For example, the same host MAC address can be shared by the host's IPv4 address, IPv6 link-local address, and IPv6 global address. Consequently, bridging to any of the addresses can result in only one entry in the Layer 2 table, compared to a Forwarding Information Base (FIB) table, where bridging to any of the addresses can result in 5 (1:2 between v4:v6) or 9 (1:4 between v4:v6) entries being used up.

Embodiments of communication system 10 can prevent flooding of IP packets due to a unicast miss in the Layer 2 table for communication within a subnet (e.g., subnet 22). Preventing flooding can facilitate scalability when the broadcast domain expands. Hosts go through a discovery based on ARP/ND process when they want to communicate with hosts within the same subnet. The on-demand installation of entries in the Layer 2 table based on trapped ARP/ND packets can ensure that data traffic from the hosts is hardware-forwarded without any drops. Non-IP traffic may remain unaffected. FIB entries may be burnt only for routing (and not bridging). FIB entries may not be used for communication to remote hosts (e.g., hosts not directly attached to the same ToR switch) within the same subnet.

According to various embodiments of communication system 10, based on the populated host database comprising {VLAN, MAC, IP, VRF, location} entries that are distributed among all ToR switches, a specific ToR switch (e.g., ToR switch 16(1)) may respond to an incoming ARP request from a local host (e.g., H1) for the MAC address of a remote host (e.g., H2) with the MAC address of the remote host, rather than its own router MAC address (as in the case of local proxy ARP). Thus, bridging semantics can be maintained as opposed to routing enforced when local proxy ARP is enabled.

Turning to the infrastructure of communication system 10, the network topology can include any number of servers, virtual machines, switches, routers, and other nodes interconnected to form a large and complex network 12. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of transmission control protocol/Internet protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the architecture shown in FIG. 1 is simplified for ease of illustration. For example, a plurality of switches (virtual and/or physical) may be provided at each network level to achieve redundancy within network 12.

The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

According to various embodiments, subnet modules 20 may be part of the hardware of ToR switches 16, for example, implemented on appropriate semiconductor chips (e.g., Application Specific Integrated Circuits (ASICs)). Subnet modules 20 may include appropriate hardware components (e.g., memory elements, processors, etc.) and associated processing capability (e.g., from instructions stored in appropriate hardware components) to perform the operations described herein.

In other embodiments, subnet modules 20 may include applications and hardware that operate together to perform the operations described herein. For example, a portion of subnet module 20 may be implemented in hardware, and another portion may be implemented in software, for example, as an application. As used herein, an "application" can be inclusive of an executable file comprising instructions that can be understood and processed on a computer, and may further include library modules loaded during execution, object files, system files, hardware logic, software logic, or any other executable modules. In some embodiments, subnet modules 20 may interface with the hardware components of ToR switches 16 to perform the operations described herein.

Fabric spine 18 may include one or more switches (or routers and such other network elements with routing, bridging, and switching functionalities) and other suitable network elements based on particular network topology considerations. Switches in fabric spine 18 may forward packets from ToR switches 16, enabling a single tier fabric in many embodiments. In some network topologies, fabric spine 18 may include one level of switches (e.g., 2 tier fat tree topology); in other network topologies, fabric spine 18 may include multiple levels of switches (e.g., 3 tier fat tree topology). The number of switches in fabric spines 18 may be based on particular network topology and performance considerations. Virtually any number of switches may be used in fabric spine 18 within the broad scope of the embodiments of communication system 10.

Figure 2:
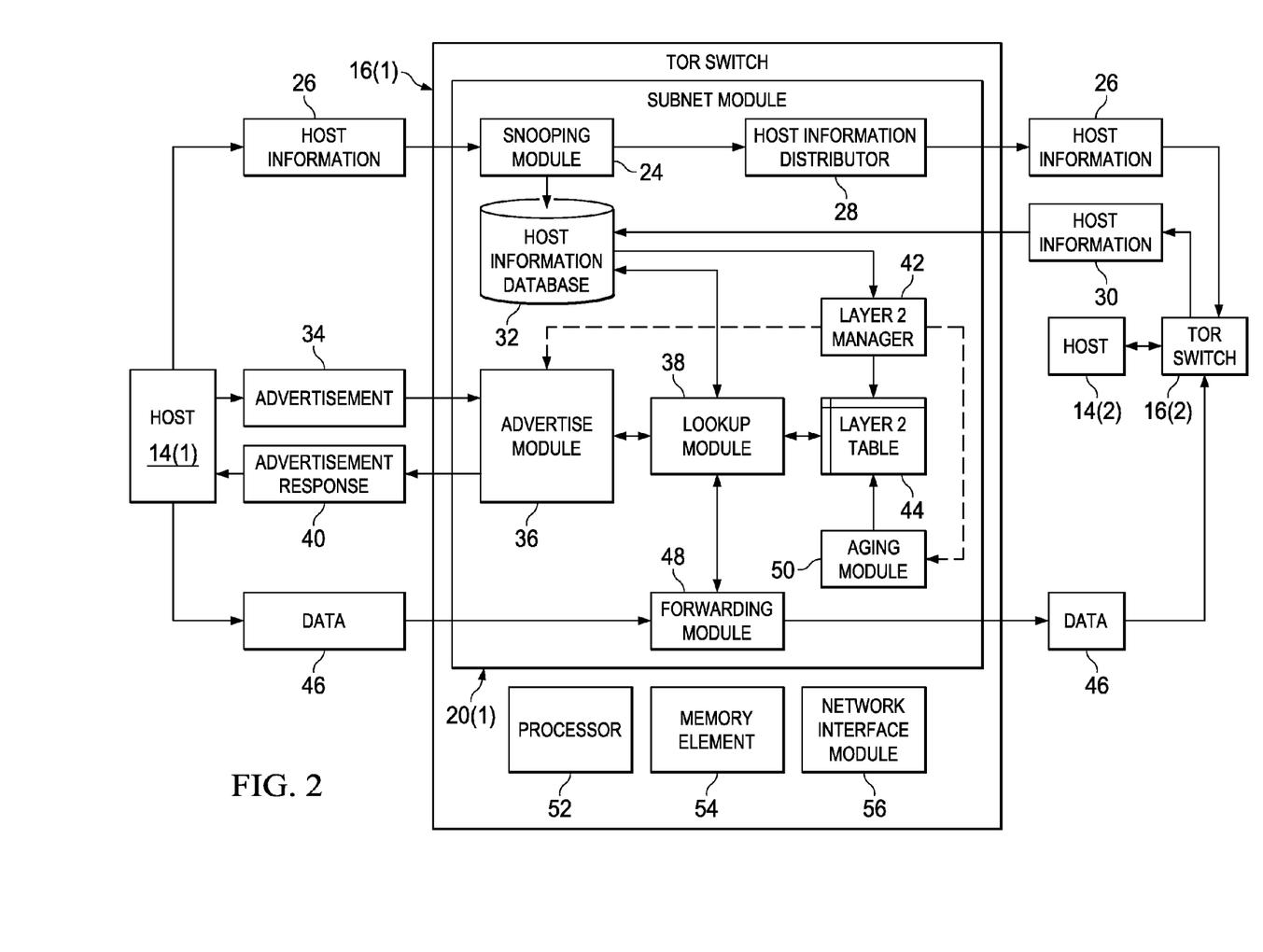
FIG. 2 is a simplified block diagram illustrating example details of the communication system in accordance with one embodiment.

Turning to FIG. 2, FIG. 2 is a simplified block diagram illustrating example details of communication system 10. Representative subnet module 20(1) in ToR switch 16(1) may include a snooping module 24 that may discover host information 26 of directly attached hosts (e.g., host 14(1)). For example, snooping module 24 may use DHCP snooping to discover directly attached host 14(1). A host information distributor 28 may distribute host information 26 to remote ToR switches (e.g., ToR switch 16(2)) within subnet 22 (of which ToR switches 16(1) and 16(2) are members). Subnet module 20(1) may also receive host information 30 of remote hosts (e.g., host 14(2)) from remote switches (e.g., ToR switch 16(2)). Host information 26 of directly attached hosts and host information 30 of remote hosts may be stored in a host information database 32.

When a directly attached host (e.g., host 14(1)) wants to speak to a remote host (e.g., host 14(2)), host 14(1) may send out an advertisement 34 seeking the MAC address of host 14(2). Advertise module 36 may intercept and trap advertisement 34. A lookup module 38 may look up host information database 32 to determine if the MAC address for host 14(2) is present therein. If the MAC address of host 14(2) is present in host information database 32, advertise module 36 may respond to host 14(1) with an advertisement response 40, comprising the MAC address of host 14(2). ToR switch 16(1) may thus proxy for host 14(2).

A Layer 2 manager 42 in subnet module 20(1) may determine (e.g., based on received advertisement 34) that host 14(1) may converse with host 14(2). Layer 2 manager 42 may retrieve the MAC address of host 14(2) from host information database 32 and populate a Layer 2 table 44. Layer 2 table 44 may include an association between the MAC address of hosts and the associated network interfaces. For example, Layer 2 table 44 may include a mapping between ports and the corresponding MAC addresses, and may be categorized according to VLANS in Layer 2. Host 14(1) may subsequently send a data 46 destined to host 14(2). Data 46 may include data and other substantive information (that may be unrelated to network parameters) from host 14(1) to host 14(2). A forwarding module 48 in subnet module 20(1) may receive data 46 and interact with lookup module 38 to lookup Layer 2 table 44, and forward data 46 appropriately on Layer 2 via the port associated with the MAC address of host 14(2).

An aging module 50 may age out entries in Layer 2 table 44 appropriately. For example, MAC addresses of directly attached hosts (e.g., host 14(1)) may be substantially never aged out. MAC addresses of remote hosts (e.g., host 14(2)) may be aged out after a predetermined time interval, if the remote hosts are not involved in active conversations. MAC addresses of remote hosts in active conversation may not be aged out during the conversation. In some embodiments, Layer 2 manager 42 may manage aging module 50. For example, Layer 2 manager 42 may interact with advertise module 36 to keep track of directly attached hosts. Solicited ARP/ND messages may be triggered to validate the presence of directly attached hosts that may not have spoken for a while. Subnet module 20(1) may interface with a processor 52, and a memory element 54 to perform the operations described herein. A network interface module 56 may facilitate communicating from and to subnet module 20(1).

Figure 3:
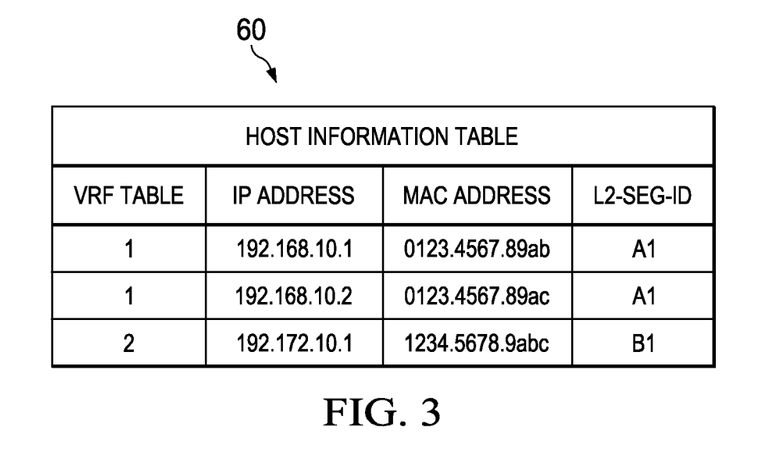
FIG. 3 is a simplified block diagram illustrating further example details of the communication system in accordance with one embodiment.

Turning to FIG. 3, FIG. 3 is a simplified diagram illustrating an example host information table 60 according to an embodiment of communication system 10. Host information table 60 represents an aggregation of host information 26 and 30 stored in host information database 32. The table format presented in FIG. 3 is merely for illustrative purposes, and is not a limitation. Host information table 60 may be stored in any appropriate format in host information database 32. Host information database 32 may be searchable by VRF table attribute and IP address attribute of host information table 60. For example, a MAC address of host 14(1) (e.g., 0123.4567.89ab) may be found by searching for the corresponding IP address (e.g., 192.168.10.1) and VRF table (e.g., VRF table 1). In some embodiments, the subnet identifier (L2-Seg-ID) may also be found from information in host information table 60.

Figure 4:
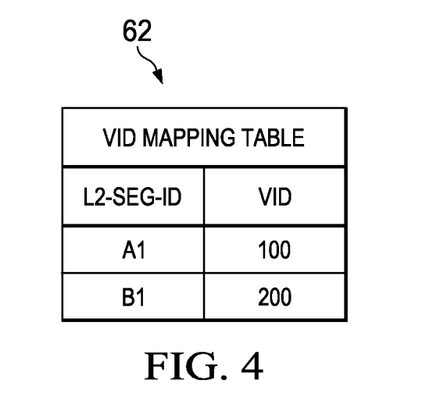
FIG. 4 is a simplified block diagram illustrating further example details of the communication system in accordance with one embodiment.

Turning to FIG. 4, FIG. 4 is a simplified diagram illustrating an example VID mapping table 62 according to embodiments of communication system 10. VID mapping table 62 may be stored in host information database 32 in some embodiments. In other embodiments, VID mapping table 62 may be stored separately, in a suitably accessible memory element. VID mapping table 62 can represent a mapping between the L2-SEG-ID (e.g., Layer 3 identifier of subnet 22) and VID (e.g., Layer 2 identifier of corresponding VLAN).

Figure 5:
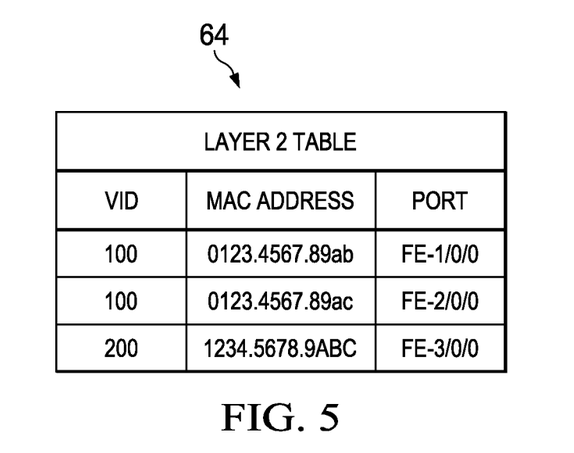
FIG. 5 is a simplified block diagram illustrating further example details of the communication system in accordance with one embodiment.

Turning to FIG. 5, FIG. 5 is a simplified diagram illustrating an example Layer 2 table 64 according to embodiments of communication system 10. Example Layer 2 table 64 represents information stored in hardware and used for forwarding packets at Layer 2. Layer 2 table 64 can include (VID, MAC) and a corresponding port/switch-ID. The port/switch-ID field may be overloaded; for example, the port/switch-ID field may store the port for directly attached hosts and the destination switch or ToR ID for remote hosts. For example, frames destined to MAC address 0123.4567.89ab may be forwarded through port FE-1/0/0. Layer 2 table 64 may be aged out in some embodiments, according to predetermined aging policies. For example, entries corresponding to directly attached hosts may not be aged out, entries corresponding to remote hosts may be aged out after a predetermined time, if the remote hosts are not engaged in active conversations with directly attached hosts, and entries corresponding to remote hosts may not be aged out during an active conversation.

Figure 6:
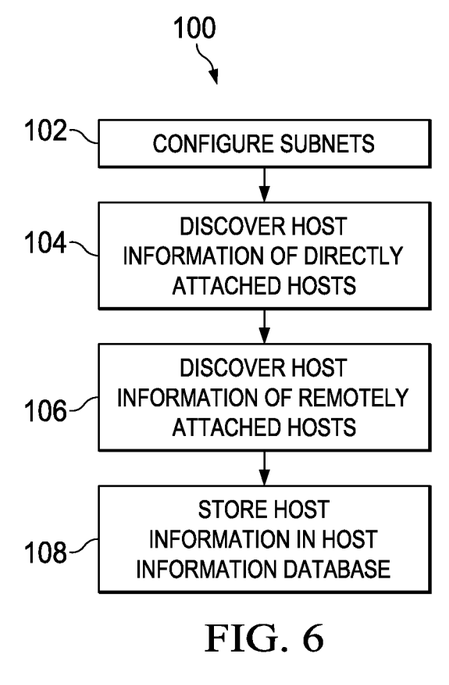
FIG. 6 is a simplified flow diagram illustrating example operations that may be associated with an embodiment of the communication system.

Turning to FIG. 6, FIG. 6 is a simplified flow diagram illustrating example operations that may be associated with subnet 20(1) according to embodiments of communication system 10. Operations 100 may include 102, at which subnet 22 (and other subnets) may be configured in network 12, for example, by a network administrator. At 104, subnet module 20(1) may discover host information 26 of directly attached host 14(1) (and other directly attached hosts). For example, DHCP/ARP/ND snooping may be employed to discover host information 26. At 106, subnet module 20(1) may discover host information 30 of remotely attached host 14(2) (and other remotely attached hosts). For example, remote ToR switch 16(2) may send remote host information 30. At 108, host information 26 and host information 30 may be stored in host information database 32 as appropriate.

Figure 7:
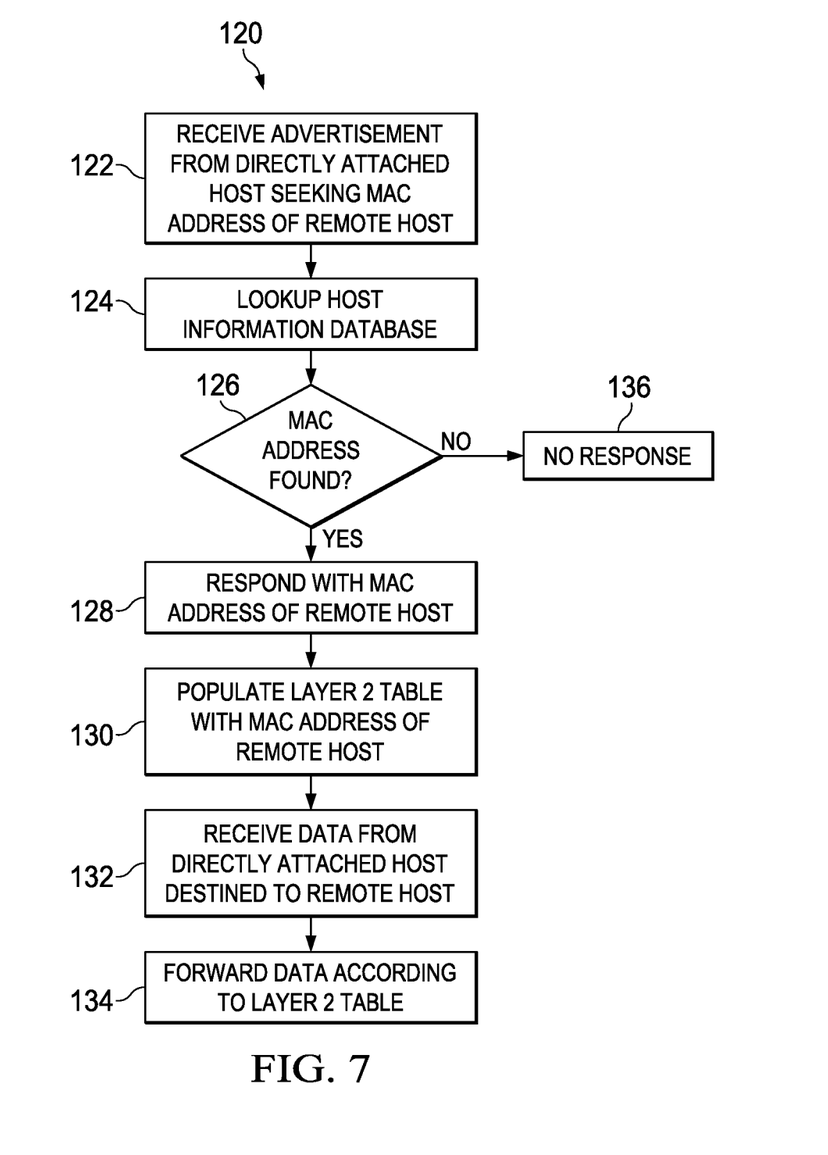
FIG. 7 is a simplified flow diagram illustrating further example operations that may be associated with an embodiment of the communication system

Turning to FIG. 7, FIG. 7 is a simplified flow diagram illustrating example operations that may be associated with subnet 20(1) according to embodiments of communication system 10. Operations 120 may include 122, at which advertisement 34 may be received from the directly attached host (e.g., host 14(1)). Advertisement 34 may seek the MAC address of a remote host (e.g., host 14(2)). At 124, host information database 32 may be looked up. At 126, a determination may be made whether the MAC address is found in host information database 32.

If the MAC address is found, at 128, subnet module 20(1) may respond with the MAC address of the remote host (e.g., host 14(2)). At 130, Layer 2 table 44 may be populated with the MAC address of the remote host (e.g., host 14(2)), in anticipation of a conversation between host 14(1) and host 14(2). At 132, data 46 may be received from the directly attached host (e.g., host 14(1)), destined to the remote host (e.g., host 14(2)). At 134, data 46 may be forwarded according to Layer 2 table 44 (e.g., through the port associated with the remote switch to which the remote host is directly attached). Turning back to 126, if the MAC address is not found in host information database 32, no response may be sent to advertisement 34, at 136.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, subnet module 20. In some embodiments, one or more of these features may be implemented in hardware, provided external to these elements, or consolidated in any appropriate manner to achieve the intended functionality. The various network elements (e.g., subnet module 20) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, subnet module 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 54, host information database 32) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification.

In one example, processors (e.g., processor 52) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 54, host information database 32) for storing information to be used in achieving operations as outlined herein. These devices may further keep information in any suitable type of non-transitory storage medium (e.g., random access memory (RAM), read only memory (ROM), field programmable gate array (FPGA), EPROM, EEPROM, etc.), software, hardware, or in any other suitable component, device, element, or object where appropriate and based on particular needs. The information being tracked, sent, received, or stored in a communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
  receiving, at a Top-Of-Rack (ToR) switch, an advertisement from a directly attached host belonging to a subnet of a network environment, wherein the advertisement seeks a Media Access Control (MAC) address of a remote host in the subnet, wherein the remote host is directly attached to another ToR switch in the subnet;
  terminating the advertisement at an advertise module of the ToR switch;
  looking up, by a lookup module in the ToR switch, a host information database in a control plane of the ToR switch for the MAC address of the remote host, wherein the host information database includes host information, including MAC addresses of other hosts in the subnet received from other ToR switches;
  mapping a segment identifier of the subnet to the MAC address of the remote host in a layer 2 table in the ToR switch's data plane;
  responding, by the advertise module, to the advertisement with the MAC address of the remote host; and
  electing not to respond to the advertisement if the MAC address is not found in the host information database.

2. The method of claim 1, wherein the advertisement comprises an Address Resolution Protocol (ARP)/Neighbor Discovery (ND) request.

3. The method of claim 1, further comprising:
  receiving, from the remote ToR switch in the subnet, host information of the remote host in the subnet, wherein the host information of the remote host comprises an Internet Protocol (IP) address and the MAC address of the remote host; and
  storing the host information in the host information database.

4. The method of claim 3, wherein the host information database is looked up based on at least the IP address of the remote host.

5. The method of claim 3, further comprising:
  discovering, by the ToR switch, another host information of the directly attached host, wherein the another host information comprises another IP address and another MAC address of the directly attached host;
  storing the another host information in the host information database; and
  distributing the another host information to the remote ToR switch.

6. The method of claim 5, wherein the another host information is discovered through at least one of the following mechanisms: Dynamic Host Configuration Protocol (DHCP) snooping, ARP/ND snooping, and Layer 2 learning.

7. The method of claim 1, further comprising:
  populating a Layer 2 table in a data plane of the ToR switch with an entry having the MAC address of the remote host;

receiving, at the ToR switch, a data from the directly attached host destined to the remote host; and forwarding the data on Layer 2 according to the Layer 2 table.

8. The method of claim 7, wherein the entry is populated in the Layer 2 table before the data is received at the ToR switch.

9. The method of claim 7, further comprising:

removing the entry from the Layer 2 table if the directly attached host does not converse with the remote host for a predetermined time duration.

10. Logic encoded in non-transitory media that includes instructions for execution and when executed by a processor, is operable to perform operations comprising:

receiving, at a Top-Of-Rack (ToR) switch, an advertisement from a directly attached host belonging to a subnet of a network environment, wherein the advertisement seeks a Media Access Control (MAC) address of a remote host in the subnet, wherein the remote host is directly attached to another ToR switch in the subnet;

terminating the advertisement at an advertise module of the ToR switch;

looking up, by a lookup module in the ToR switch, a host information database in a control plane of the ToR switch for the MAC address of the remote host, wherein the host information database includes host information, including MAC addresses of other hosts in the subnet received from other ToR switches; and mapping a segment identifier of the subnet to the MAC address of the remote host in a Layer 2 table in the ToR switch's data plane;

responding, by the advertise module, to the advertisement with the MAC address of the remote host; and electing not to respond to the advertisement if the MAC address is not found in the host information database.

11. The logic of claim 10, the operations further comprising:

receiving, from the remote ToR switch in the subnet, host information of the remote host in the subnet, wherein the host information of the remote host comprises an IP address and the MAC address of the remote host; and storing the host information in the host information database.

12. The logic of claim 11, the operations further comprising:

discovering, by the ToR switch, another host information of the directly attached host, wherein the another host information comprises another IP address and another MAC address of the directly attached host;

storing the another host information in the host information database; and distributing the another host information to the remote ToR switch.

13. The logic of claim 10, the operations further comprising:

populating a Layer 2 table in a data plane of the ToR switch with an entry having the MAC address of the remote host;

receiving a data from the directly attached host destined to the remote host; and forwarding the data on Layer 2 according to the Layer 2 table.

14. An apparatus, comprising:

a ToR switch having a subnet module comprising an advertise module and a lookup module;

a memory element for storing data; and a processor operable to execute instructions associated with the data, wherein the subnet module, the processor and the memory element cooperate, such that the apparatus is configured for:

receiving, at the ToR switch, an advertisement from a directly attached host belonging to a subnet of a network environment, wherein the advertisement seeks a Media Access Control (MAC) address of a remote host in the subnet, wherein the remote host is directly attached to another ToR switch in the subnet;

terminating the advertisement at the advertise module;

looking up, by the lookup module, a host information database in a control plane of the ToR switch for the MAC address of the remote host, wherein the host information database includes host information, including MAC addresses of other hosts in the subnet received from ToR switches; and mapping a segment identifier of the subnet to the MAC address of the remote host in a layer 2 table in the ToR switch's data plane;

responding, by the advertise module, to the advertisement with the MAC address of the remote host; and electing not to respond to the advertisement if the MAC address is not found in the host information database.

15. The apparatus of claim 14, further configured for:

receiving, from the remote ToR switch in the subnet, host information of the remote host in the subnet, wherein the host information of the remote host comprises an IP address and the MAC address of the remote host; and storing the host information in the host information database.

16. The apparatus of claim 15, further configured for:

discovering, by the ToR switch, another host information of the directly attached host, wherein the another host information comprises another IP address and another MAC address of the directly attached host;

storing the another host information in the host information database; and distributing the another host information to the remote ToR switch.

17. The apparatus of claim 14, further configured for:

populating a Layer 2 table in a data plane of the ToR switch with an entry having the MAC address of the remote host;

receiving a data from the directly attached host destined to the remote host; and forwarding the data on Layer 2 according to the Layer 2 table.

* * * * *